(12) United States Patent
Mahgerefteh et al.

(10) Patent No.: US 7,433,605 B2
(45) Date of Patent: Oct. 7, 2008

(54) ADIABATIC FREQUENCY MODULATED TRANSMITTER WITH NEGATIVE CHIRP

(75) Inventors: Daniel Mahgerefteh, Palo Alto, CA (US); Parviz Tayebati, Boston, MA (US)

(73) Assignee: Finisar Corporation, Sunnyvale, CA (US)

(*) Notice: Subject to any disclaimer, the term of this patent is extended or adjusted under 35 U.S.C. 154(b) by 379 days.

(21) Appl. No.: 11/040,053

(22) Filed: Jan. 21, 2005

(65) Prior Publication Data

US 2005/0286829 A1 Dec. 29, 2005

Related U.S. Application Data

(63) Continuation-in-part of application No. 10/289,944, filed on Nov. 6, 2002, now Pat. No. 6,963,685, and a continuation-in-part of application No. 10/308,522, filed on Dec. 3, 2002, and a continuation-in-part of application No. 10/680,607, filed on Oct. 6, 2003, now Pat. No. 7,054,538.

(60) Provisional application No. 60/537,737, filed on Jan. 20, 2004.

(51) Int. Cl.
  *H04B 10/04* (2006.01)
  *H04B 10/12* (2006.01)
(52) U.S. Cl. ................. 398/193; 398/185; 398/199
(58) Field of Classification Search ............ 398/185, 398/193, 199
  See application file for complete search history.

(56) References Cited

U.S. PATENT DOCUMENTS

| | | | |
|---|---|---|---|
| 4,561,119 A | 12/1985 | Epworth | |
| 4,805,235 A | 2/1989 | Henmi | |
| 5,416,629 A | 5/1995 | Huber | |
| 5,920,416 A | 7/1999 | Beylat et al. | |
| 6,104,851 A | 8/2000 | Mahgerefteh | |
| 6,115,403 A | 9/2000 | Brenner et al. | |
| 6,298,186 B1 | 10/2001 | He | |

(Continued)

FOREIGN PATENT DOCUMENTS

GB  2107147 A  4/1983

OTHER PUBLICATIONS

Chang-Hee Lee et al., Transmission of Directly Modulated 2.5-Gb/s Signals Over 250-kn of Nondispersion-Shifted Fiber by Using a Spectral Filtering Method, IEEE Photonics Technology Letters, Dec. 1996, 1725-1727, vol. 8, No. 12.

(Continued)

*Primary Examiner*—Jason Chan
*Assistant Examiner*—Nathan M Curs
(74) *Attorney, Agent, or Firm*—Workman Nydegger (57) ABSTRACT

The invention, in one form, is a fiber optic system having an optical signal source adapted to produce a frequency and amplitude modulated optical digital signal and a semiconductor optical amplifier adapted to receive the frequency and amplitude modulated optical digital signal and generate negative transient chirp at the transitions between bits. In another form, the invention is a fiber optic system having an optical source adapted to generate a frequency modulated signal, a semiconductor optical amplifier adapted to receive and amplify the frequency modulated signal, and an optical spectrum reshaper adapted to receive the amplified frequency modulated signal and to utilize the amplified frequency modulated signal to increase the amplitude modulation of the signal.

8 Claims, 5 Drawing Sheets

System configuration of negative chirp AFM source using semiconductor optical amplifier

U.S. PATENT DOCUMENTS

| | | |
|---|---|---|
| 6,331,991 B1 | 12/2001 | Mahgerefteh |
| 6,563,623 B1 * | 5/2003 | Penninckx et al. .......... 398/188 |
| 6,947,206 B2 * | 9/2005 | Tsadka et al. ............... 359/333 |
| 6,963,685 B2 | 11/2005 | Mahgerefteh et al. |
| 7,054,538 B2 | 5/2006 | Mahgerefteh et al. |
| 2003/0099018 A1 * | 5/2003 | Singh et al. ................. 359/152 |
| 2004/0008933 A1 | 1/2004 | Mahgerefteh et al. |
| 2004/0096221 A1 | 5/2004 | Mahgerefteh et al. |

OTHER PUBLICATIONS

P.J. Corvini, et al., Computer Simulation of High-Bit-Rate Optical Fiber Transmission Using Single-Frequency Lasers, Journal of Lightwave Technology, Nov. 1987, 1591-1595, vol. LT-5, No. 11.

* cited by examiner

Fig. 1

System configuration of negative chirp AFM source using semiconductor optical amplifier

Fig. 2

Intensity and frequency excursion of AFM source before and after a saturated SOA.

Fig. 3

An AFM source and saturated SOA in a transmission system

Fig. 4

System configuration in which the optical discriminator is after the directly modulated laser and SOA

Fig. 5

System configuration with isolator or loss element between directly modulated semiconductor laser and SOA

# ADIABATIC FREQUENCY MODULATED TRANSMITTER WITH NEGATIVE CHIRP

REFERENCE TO PENDING PRIOR PATENT APPLICATIONS

This patent application:

(i) is a continuation-in-part of prior U.S. patent application Ser. No. 10/289,944, filed Nov. 6, 2002 now U.S. Pat. No. 6,963,685 by Daniel Mahgerefteh et al. for POWER SOURCE FOR A DISPERSION COMPENSATION FIBER OPTIC SYSTEM;

(ii) is a continuation-in-part of pending prior U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) is a continuation-in-part of prior U.S. patent application Ser. No. 10/680,607, filed Oct. 6, 2003 now U.S. Pat. No. 7,054,538 by Daniel Mahgerefteh et al. for FLAT DISPERSION FREQUENCY DISCRIMINATOR (FDFD); and (iv) claims benefit of pending prior U.S. Provisional Patent Application Ser. No. 60/537,737, filed Jan. 20, 2004 by Daniel Mahgerefteh et al. for ADIABATIC FREQUENCY MODULATED SOURCE WITH NEGATIVE CHIRP.

The four above-identified patent applications are hereby incorporated herein by reference.

FIELD OF THE INVENTION

This invention relates to signal transmissions in general, and more particularly to the transmission of optical signals.

BACKGROUND OF THE INVENTION

The quality and performance of a digital fiber optic transmitter is determined by the distance over which its signal can propagate without severe distortions. The Bit Error Rate (BER) of the signal is measured at a receiver after propagation through dispersive fiber, and then the optical power required to obtain a certain BER (typically $10^{-12}$), sometimes called the sensitivity, is determined.

The difference in sensitivity between (i) the output of the transmitter, and (ii) the sensitivity after propagation through a fiber, is sometimes called the dispersion penalty. This sensitivity difference is typically characterized with respect to the distance over which the dispersion penalty reaches ~1 dB. A standard 10 Gb/s optical digital transmitter, such as an externally modulated source, can transmit up to a distance of ~50 km in standard single mode fiber, at 1550 nm, before it reaches a dispersion penalty of ~1 dB; this distance is sometimes called the dispersion limit. This particular limit is determined by the fundamental assumption that the signal is transform limited, i.e., the signal has no time varying phase across its bits and has a bit period of 100 ps, or 1/bit rate.

Another measure of the quality of a transmitter is the absolute sensitivity after fiber propagation.

Systems for long-reach lightwave data transmission through optical fibers are disclosed in: (i) U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM ; (ii) U.S. patent application Ser. No. 10/680,607, filed Oct. 6, 2003 by Daniel Mahgerefteh et al. for FLAT DISPERSION FREQUENCY DISCRIMINATOR (FDFD); and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;, which patent applications are hereby incorporated herein by reference. The transmitter associated with these novel systems is sometimes referred to as a Chirp Managed Laser (CML)™ by Azna LLC of Wilmington, Mass.

In these new systems, an Adiabatically Frequency Modulated (AFM) source is followed by an Optical Spectrum Reshaper (OSR) which uses the frequency modulation to increase the amplitude modulated signal and partially compensates for dispersion in the transmission fiber. The Optical Spectrum Reshaper (OSR), sometimes referred to as a frequency discriminator, can be formed by an appropriate optical element that has a wavelength-dependent transmission function. The OSR can be adapted to convert frequency modulation to amplitude modulation. Importantly, the OSR can also be adapted to convert amplitude modulation to frequency modulation.

SUMMARY OF THE INVENTION

In one form of the invention, there is provided a novel technique for extending the reach of the CML™ transmitter to 200 km or longer, at 10 Gb/s, by adding a Semiconductor Optical Amplifier (SOA) after the Chirp Managed Laser (CML)™ so as to create beneficial negative chirp.

In another form of the invention, there is provided a fiber optic system comprising:

an optical signal source adapted to produce a frequency and amplitude modulated optical digital signal; and a semiconductor optical amplifier adapted to receive the frequency and amplitude modulated optical digital signal and generate negative transient chirp at the transitions between bits.

In another form of the invention, there is provided a fiber optic system comprising:

an optical source adapted to generate a frequency modulated signal;

a semiconductor optical amplifier adapted to receive and amplify the frequency modulated signal; and an optical spectrum reshaper adapted to receive the amplified frequency modulated signal and to utilize the amplified frequency modulated signal to increase the amplitude modulation of the signal.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

In the present invention, the Chirp Managed Laser (CML)™ generates a frequency and amplitude modulated signal for which the amplitude and frequency profiles are substantially concomitant. One example of such a CML source has been described in U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM, which patent application is hereby incorporated herein by reference. The CML™ transmitter comprises an Adiabatically Frequency Modulated (AFM) source followed by an Optical Spectrum Reshaper (OSR), sometimes also referred to as an FM discriminator, which converts frequency modulation to amplitude modulation. In one preferred embodiment of the present invention, the AFM source is a directly modulated distributed feedback (DFB) laser followed by a coupled multicavity filter with a nearly Gaussian profile. It has been shown that the CML™ transmitter, at 10 Gb/s, can compensate for fiber dispersion (at a level of 1600 ps/nm dispersion) so as to achieve an extended reach of 100 km.

Figure 1:
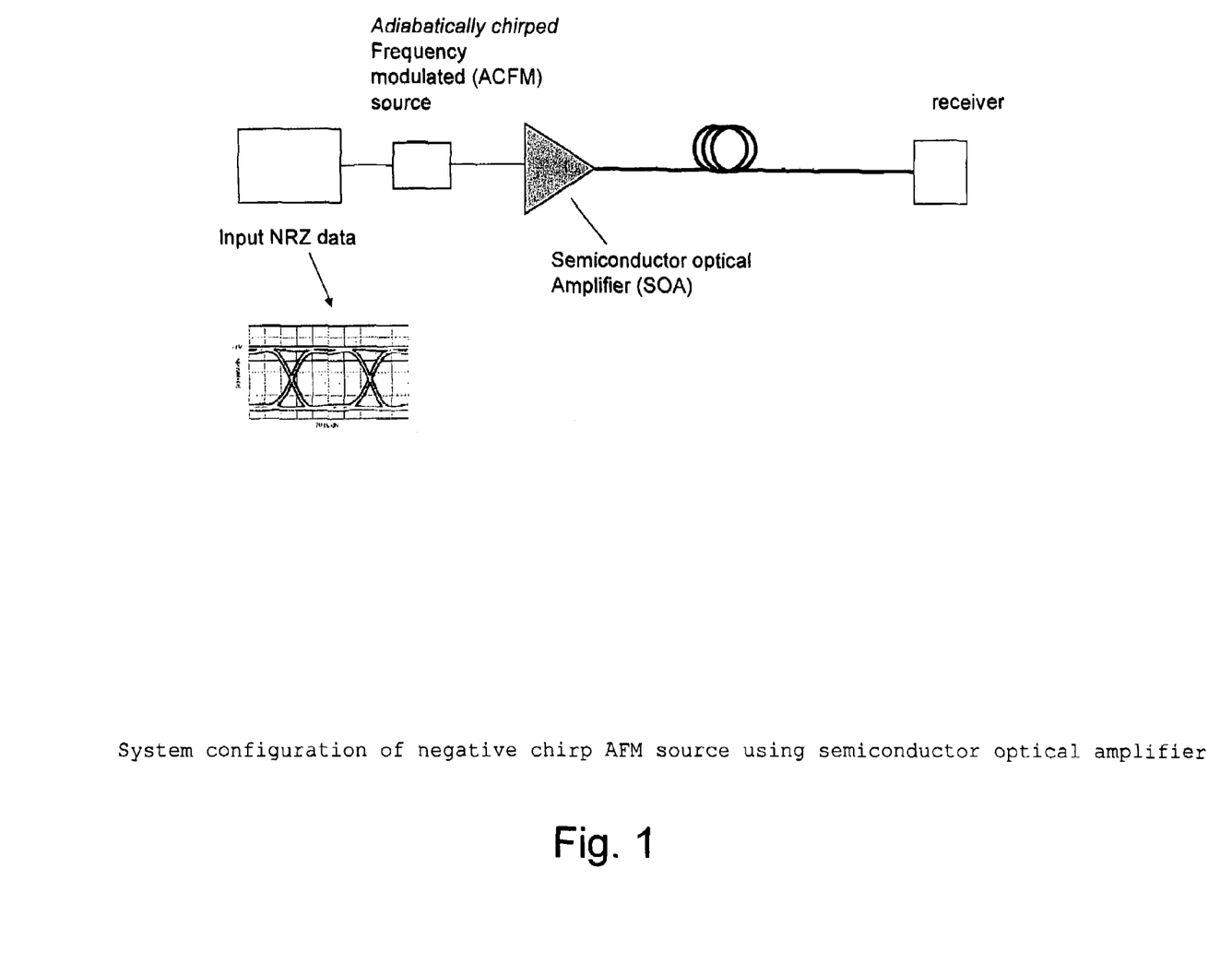
FIG. 1 is schematic diagram illustrating an Adiabatic Frequency Modulated (AFM) source using a Semiconductor Optical Amplifier (SOA) to provide beneficial negative chirp.
Figure 2:
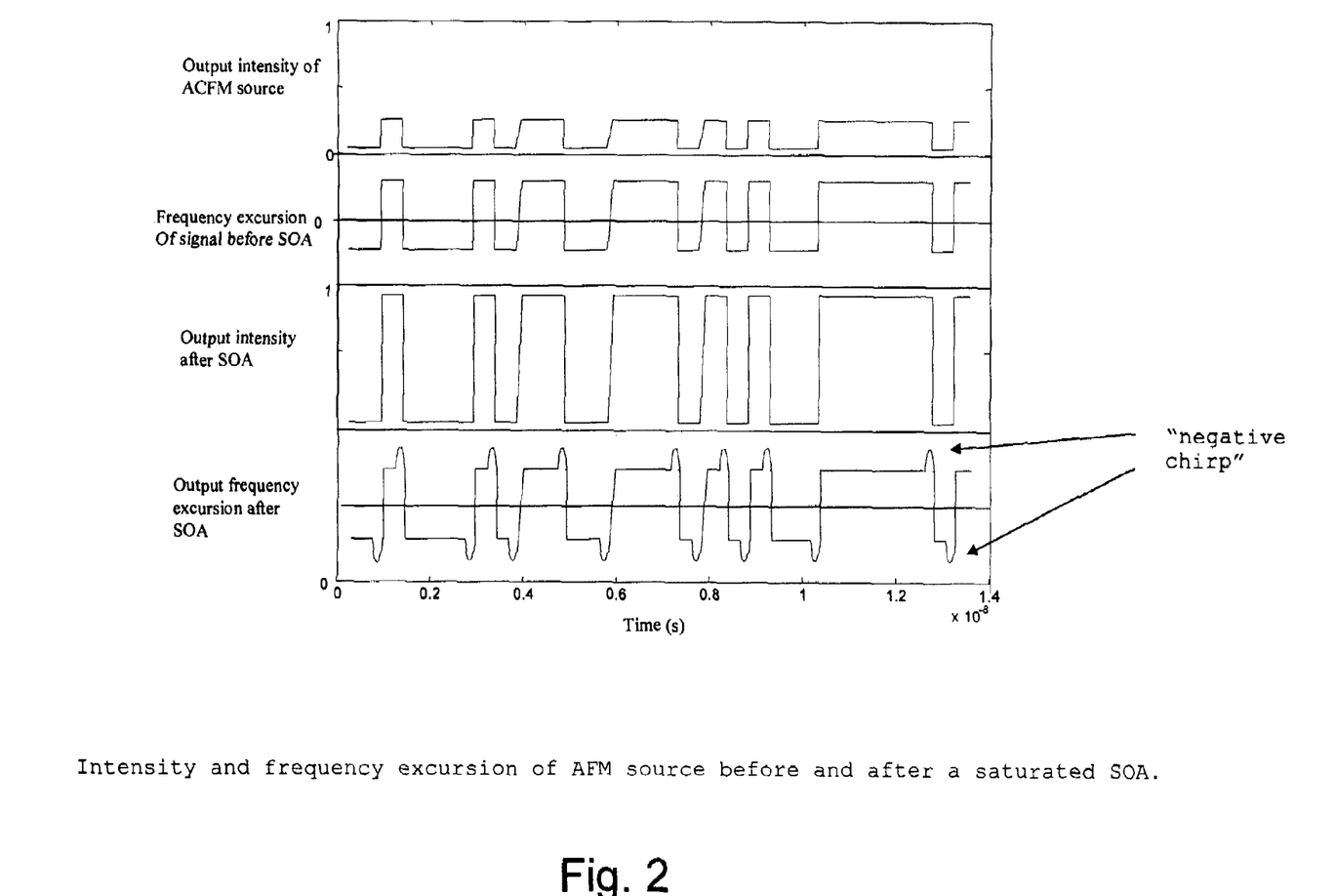
FIG. 2 is a schematic diagram illustrating the intensity and frequency excursions of the signal both before, and after passing through, a saturated SOA.

In a preferred embodiment of the present invention, there is provided an approach for extending the reach of the CML™ transmitter to 200 km or longer, at 10 Gb/s, by adding a Semiconductor Optical Amplifier (SOA) after the CML™. See FIG. 1. As will hereinafter be discussed in further detail, the SOA serves to introduce beneficial negative chirp to the signal produced by the CML™ (also sometimes referred to as the Adiabatically Chirped Frequency Modulated source, or ACFM) prior to passing the signal into the transmission fiber. In this approach, the reach is extended because the Semiconductor Optical Amplifier (SOA) generates negative transient chirp, as shown in FIG. 2, at the bit transitions. For the purposes of this disclosure, negative transient chirp is defined as a red-shifted frequency shift at the 0 to 1 transitions, and a blue-shifted frequency shift at the 1 to 0 transitions.

In order to generate the desired negative transient chirp, the Semiconductor Optical Amplifier (SOA) is operated in saturation and has a short carrier lifetime, for example on the order of 50 ps for 10 Gb/s applications.

An SOA is traditionally used as an optical amplifier, and increases the input optical power by a certain gain factor. The gain of a Semiconductor Optical Amplifier (SOA), as a function of input power, is typically nearly constant for low input powers. This feature is commonly called the linear regime. In this case, the gain is independent of input power and the output data pulses are amplified without distortion or chirp.

On the other hand, the SOA gain decreases with increasing input power for higher input powers to the SOA. This feature is typically called the saturation regime. In the saturation regime, the gain of the SOA is altered by the input optical bit pattern, therefore generating chirp at the transitions. A 1 bit, having a higher optical power, reduces the gain. This feature is typically called gain depletion. A 0 bit, having lower power, allows the gain to recover.

The SOA provides gain by carrier injection, which fills the conduction band of the semiconductor material by electrons, and the valence band by holes, and therefore creates a population inversion, which provides optical gain. The carrier density responds to changes in the system with a characteristic time constant, generally called the carrier lifetime. Because the carrier lifetime is fast (typically 50-200 ps), and on the order of the bit period for a 10 Gb/s signal (e.g., 100 ps), the gain depletion nearly follows the bit pattern. As the gain of the SOA is modulated by the incoming optical signal, the refractive index of the gain medium also changes as described by the Kramers Kroning relation. A time varying index change produces frequency shifts, i.e., chirp, which only occur at the transitions from a 1 bit to a 0 bit and 0 to 1 bit.

FIG. 2 shows the intensity modulation as well as the frequency modulation, before and after a saturated SOA (which induces beneficial transient chirp). Note that the transient chirp is negative; i.e., the transient chirp is red-shifted for a 0 to 1 transition (i.e., the frequency is temporarily decreased), and blue shifted for a 1 to 0 transition (i.e., the frequency is temporarily increased).

More particularly, when the input makes the transition from 0 to 1, the gain of the SOA is reduced slightly as the carrier density is reduced. A lowered carrier density causes an increase in the refractive index. Also, the frequency shift is the negative time derivative of index change. Hence, the frequency shift for a 0 to 1 transition is negative, thus, it is red-shifted. A similar analysis can be used to show that the frequency shift of the 1 to 0 transitions is blue-shifted. Hence, the transient chirp of the SOA is negative. This is the opposite sign of transient chirp for a directly modulated laser. The negative chirp induced by the SOA causes the Non-Return-To-Zero (NRZ) pulses to compress when propagating through standard fiber with positive dispersion. The standard single mode fiber has positive dispersion for 1550 nm wavelength. In other words, by adding an SOA downstream of the AFM transmitter, the SOA can introduce transient chirp with the opposite sign of the transient chirp normally produced by the directly modulated laser, whereby to cause the signal pulses to compress and thereby extend transmission range. Note also that the AFM source, such as a CML™, has adiabatic chirp, which is beneficial to achieving long reach transmission, and can be adapted to produce little transient chirp. The addition of the SOA in saturation generates negative chirp and extends the reach of the AFM source further.

It should also be noted that the SOA provides optical gain for long distance applications in which a large launch power is required.

Figure 3:
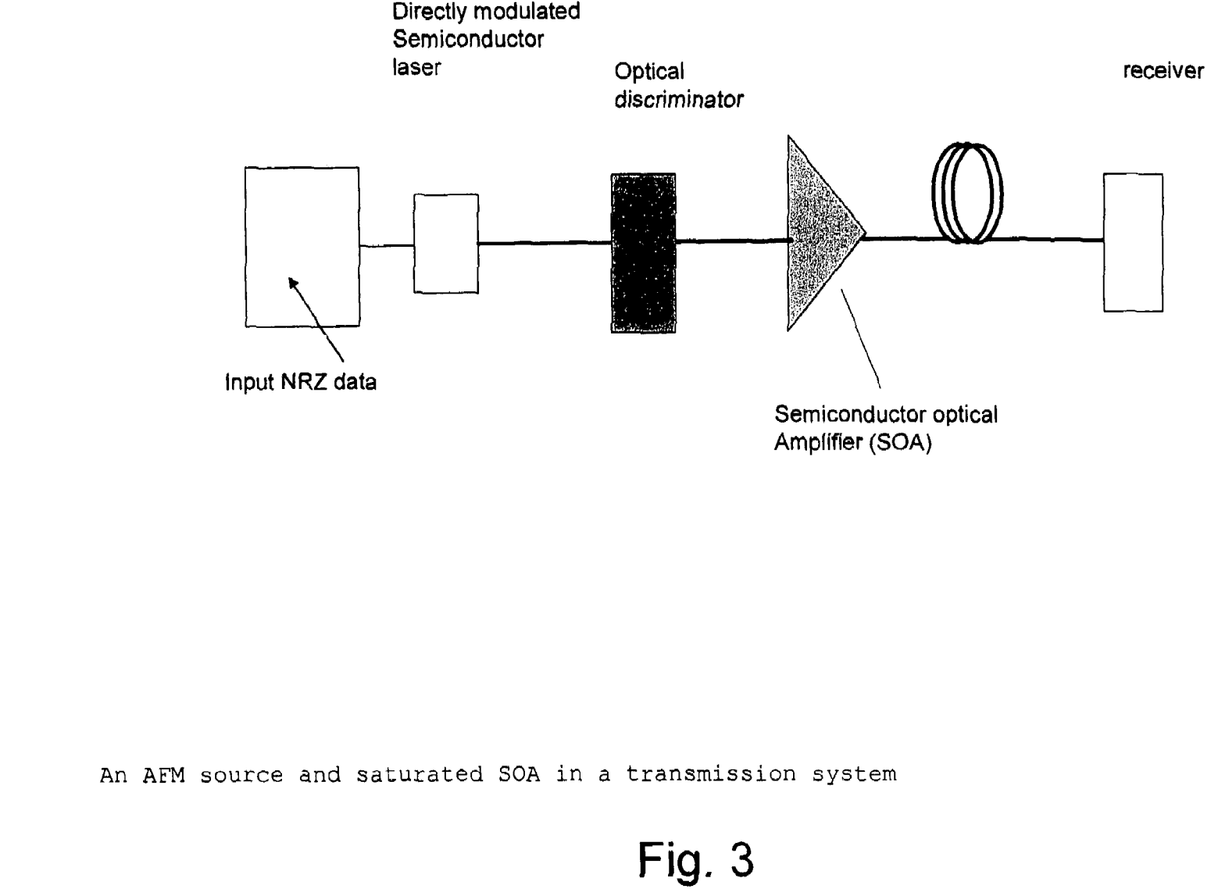
FIG. 3 is a schematic diagram illustrating a system comprising an Adiabatically Frequency Modulated (AFM) source, an Optical Spectrum Reshaper (OSR) and a Semiconductor Optical Amplifier (SOA)

In another embodiment of the present invention, the Adiabatically Frequency Modulated (AFM) source comprises a frequency modulated source, such as a directly modulated laser biased high above threshold, and having predominantly adiabatic chirp, followed by a bandwidth limiting optical discriminator (OSR), as described in: (i) U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM; (ii) U.S. patent application Ser. No. 10/680,607, filed Oct. 6, 2003 by Daniel Mahgerefteh et al. for FLAT DISPERSION FREQUENCY DISCRIMINATOR (FDFD); and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR; which patent applications are hereby incorporated herein by reference. The output of the optical discriminator is directed into the Semiconductor Optical Amplifier (SOA), and the output of the SOA is directed into the fiber. FIG. 3 shows the configuration where the AFM source is followed by the OSR and then by the SOA.

Figure 4:
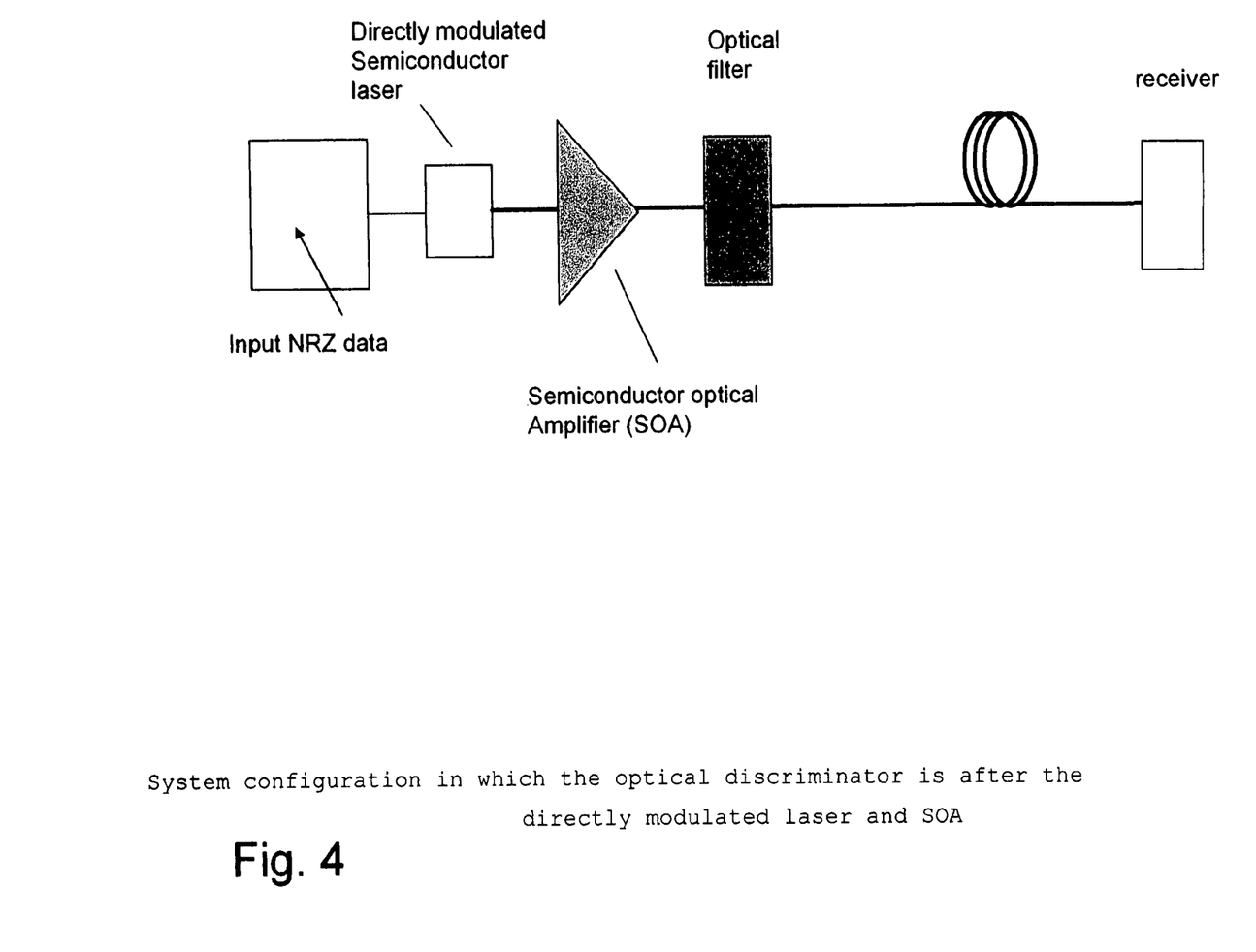
FIG. 4 is a schematic diagram illustrating a system like that shown in FIG. 3, except that the SOA is placed before the OSR.

In another embodiment of the present invention, the optical discriminator (OSR) is placed after the SOA. FIG. 4 shows this configuration. In this configuration, the FM source may be a directly modulated laser or a fast tunable multi-section laser. The output of the SOA passes through the optical discriminator (OSR), which converts the adiabatic chirp to amplitude modulation and increases the extinction ratio. In this configuration, the filter bandwidth (BW) is wide enough to pass part of the red and blue-shifted transient chirp components introduced by the SOA. The complete system also comprises the transmission fiber and a receiver.

In yet another embodiment of the present invention, the discriminator (optical filter) shown in FIG. 4 may be chosen so as to be bandwidth-limiting and "clean up" amplitude related distortions produced by the SOA. Thus, for example, the negative transient chirp components may be reduced and the SOA may be a gain element with reduced amplitude distortions.

In still another embodiment of the system shown in FIG. 4, the semiconductor laser and the SOA may be integrated on the same chip for ease of packaging and cost reduction. In this embodiment, the distributed feedback (DFB) laser and the SOA sections of the chip may need to be isolated by placing a loss element between the two so as to reduce back reflection from the SOA to the laser.

Figure 5:
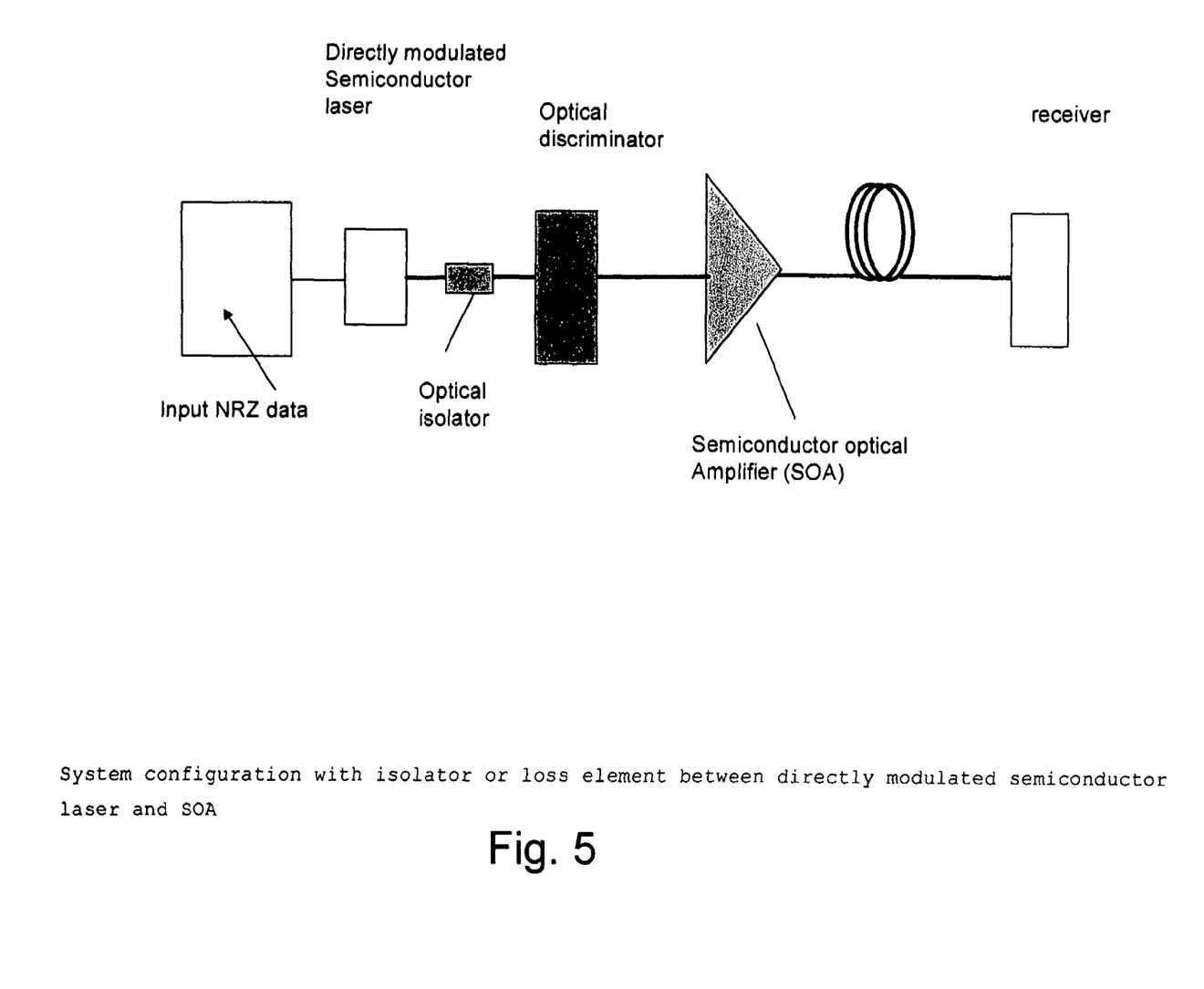
FIG. 5 is a schematic diagram illustrating how an optical isolator may be placed between the AFM source and the SOA.

In another embodiment of the present disclosure, and as shown in FIG. 5, there is provided an optical isolator or loss element between the Frequency Modulated Source (FMS), i.e., the directly modulated semiconductor laser, and the SOA. Amplified Spontaneous Emission (ASE) from the SOA may reflect back and cause chirping of the laser since the SOA is being modulated. The isolator or loss element reduces the back reflection.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A method for reducing dispersion in an optical signal comprising:

generating an electrical signal transitioning between logical 1 and 0 levels;

modulating a laser according to the electrical signal to generate a frequency modulated signal;

converting the frequency modulated signal to an amplitude modulated signal in an optical spectrum reshaper (OSR);

passing the amplitude modulated signal from the OSR through a semiconductor optical amplifier to generate a red- and blue-shifted amplitude modulated signal having a red-shifted negative chirp upon 0 to 1 transitions in the amplitude modulated signal and a blue-shifted negative chirp upon 1 to 0 transitions in the amplitude modulated signal;

inserting the red- and blue-shifted amplitude modulated signal into an optical fiber; and transmitting the red- and blue-shifted amplitude modulated signal through the optical fiber to a receiver.

2. The method of claim 1, further comprising operating the semiconductor optical amplifier in saturation.

3. The method of claim 1, wherein a frequency profile of the amplitude modulated signal is concomitant with an amplitude profile thereof.

4. The method of claim 1, wherein the optical spectrum reshaper is a bandwidth limiting band pass filter.

5. The method of claim 1, wherein the optical source is a distributed feedback laser.

6. The method of claim 5, wherein the distributed feedback laser is integrated with the semiconductor optical amplifier.

7. The method of claim 6, further comprising passing the frequency modulated signal through an optical isolator disposed between the distributed feedback laser and the semiconductor optical amplifier.

8. The method of claim 6, further comprising passing the frequency modulated signal through a loss element disposed between the distributed feedback laser and the semiconductor optical amplifier.

* * * * *

UNITED STATES PATENT AND TRADEMARK OFFICE
CERTIFICATE OF CORRECTION

PATENT NO. : 7,433,605 B2
APPLICATION NO. : 11/040053
DATED : October 7, 2008
INVENTOR(S) : Mahgerefteh et al.

It is certified that error appears in the above-identified patent and that said Letters Patent is hereby corrected as shown below:

Title Page
Item 56, References Cited, Other Publications, change "Chang-Hee Lee et al., Transmission of Directly Modulated 2.5-Gb/s Signals Over 250-kn of Nondispersion-Shifted Fiber by Using a Spectral Filtering Method, IEEE Photonics Technology Letters, Dec. 1996, 1725-1727, vol. 8, No. 12." to --Chang-Hee Lee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.--

Column 2
Line 9, change "(OSR) which" to --(OSR), which--

Column 3
Line 44, change "lifetime, for example on" to --lifetime, for example, on--
Line 45, change "applications." to --applications, for example.--

Column 4
Line 4, change "changes as described" to --changes, as described--

Signed and Sealed this

Twenty-third Day of February, 2010

David J. Kappos
*Director of the United States Patent and Trademark Office*